July 17, 1923.
H. CHARLET
1,462,226
INHERENTLY REGULATED DIRECT CURRENT DYNAMO
Original Filed July 8, 1920     2 Sheets-Sheet 1
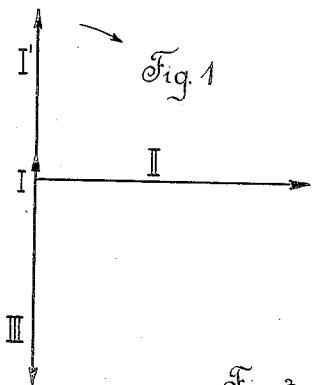
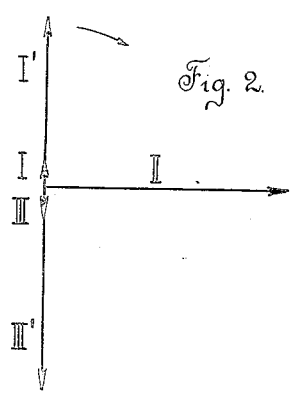
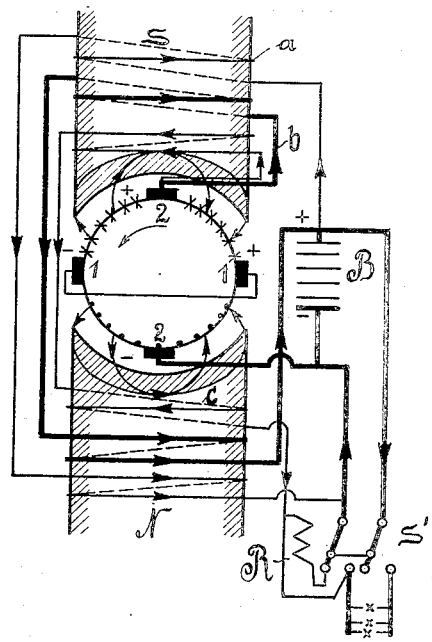
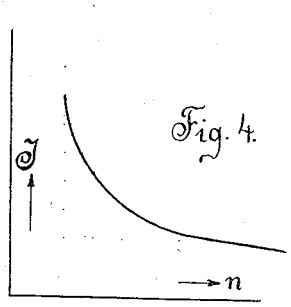

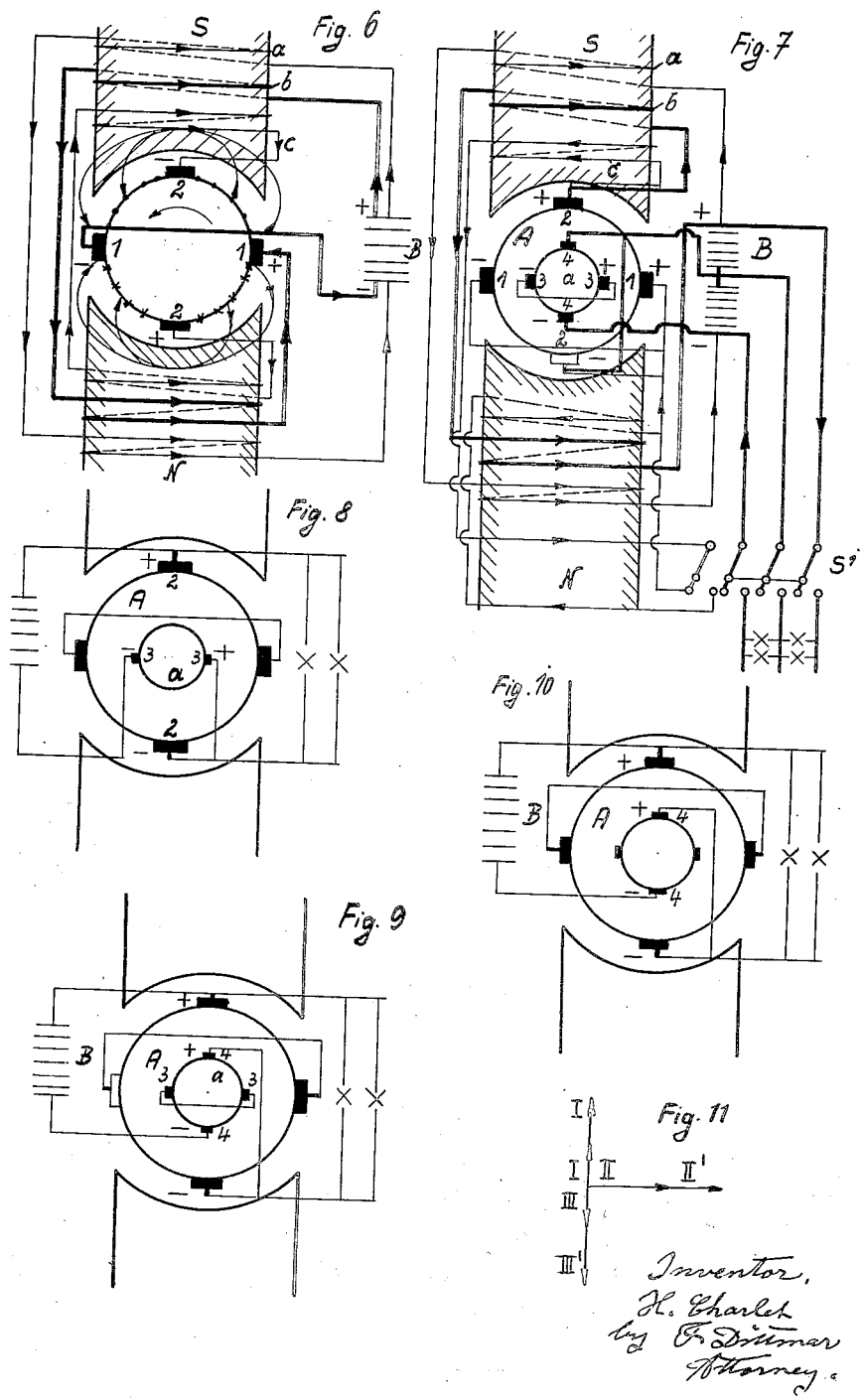

Patented July 17, 1923.

1,462,226

UNITED STATES PATENT OFFICE.

HANS CHARLET, OF KREFELD, GERMANY.

INHERENTLY-REGULATED DIRECT-CURRENT DYNAMO.

Original application filed July 8, 1920, Serial No. 394,849. Divided and this application filed April 8, 1922. Serial No. 549,299.

*To all whom it may concern:*

Be it known that I, HANS CHARLET, residing at Krefeld, Germany, Spinnereistrasse 23, have invented certain new and useful Improvements in Inherently-Regulated Direct-Current Dynamos, (for which I have filed applications in Germany, March 30, 1918, and June 24, 1918; Great Britain, filed July 2, 1920, patented December 2, 1921; France, filed July 16, 1920, patented March 30, 1921; Belgium, filed June 26, 1920, patented July 15, 1920; Spain, filed August 2, 1920, patented January 4, 1921; Italy, filed June 22, 1920; Holland, filed June 25, 1920; Switzerland, filed August 24, 1920; Czechoslovakia, filed July 5, 1920, and August 10, 1921; Sweden, filed June 29, 1920; Norway, filed June 30, 1920; Denmark, filed July 19, 1920; and Canada, filed May 25, 1921), of which the following is a specification.

This application is a division of application No. 394,849, filed July 8, 1920.

This invention relates to inherently regulated direct current dynamos.

It has already been suggested to employ short-circuited brushes in the neutral zone of a two-pole machine. In this case only a very small excitation is necessary to allow a very strong current to flow between the short-circuited brushes. This small excitation produces on one hand the primary field I, on the other hand, as is known, the much stronger cross-field (secondary field II) produced by the current flowing in the armature-winding between the brushes. This secondary field, leads by 90° in advance of the primary field. In the neutral zone of this secondary field a second set of brushes may be placed. When a working-current is to be derived from such a machine, the primary field will, from the very first, have to be strengthened by an amount corresponding to the armature reaction originating from the tertiary field. This tertiary field leads the secondary field by 90° or 180° ahead of the primary field and therefore acts contrary to the latter. Fig. 1 is the known field diagram of a machine of this kind.

Fig. 2 is a view showing the primary field.

Fig. 3 is a view showing the counter exciting winding.

Fig. 4 is a view showing the flow approximating a hyperbola.

Fig. 5 shows another field diagram.

Fig. 6 is a view showing the connections for motor work.

Fig. 7 is a view showing a second collector on the armature.

Fig. 8 shows the differential charging of the battery.

Fig. 9 is a similar view showing the short circuiting of the brushes.

Fig. 10 shows a somewhat modified form of Fig. 9.

Fig. 11 is a view showing a secondary field originating from the primary main field.

According to the invention, the primary field I is increased by a greater value I', by the constant excitation being correspondingly increased. Furthermore a counter exciting winding $c$, (neutralizing winding) Fig. 3 is connected to the poles, said winding being connected to the service brushes lying within the neutral zone of the secondary field, and acting contrary to the field I—I', being so dimensioned, that the field III' Fig. 2, produced by it, combined with the reaction III of the current of winding $c$ flowing in the armature winding over the service brushes will, at a given speed, just compensate the additional field I'. With such a machine the potential at the service brushes will, when the machine is running idle, at a varying speed, remain practically constant, if the ratio of field I to the additional field I' has been chosen sufficiently large. On the one hand, the potential produced in the secondary field by the rotation of the armature will with an increasing speed, likewise increase; on the other hand however, the current flowing in the armature winding over the service brushes 2—2 and in the counter exciting winding $c$ (neutralizing winding) will thereby be increased, and the primary field I and with it also the secondary field II will be weakened. By so suitably dimensioning the various excitations that the potential at the service brushes may remain constant with an increasing speed, or rise and fall therewith. If, for example, Fig. 2, the primary field, necessary for exciting the secondary field, amounts to 10% of the fields III+III', which are produced by the current flowing through the counter exciting winding $c$, the potential at the brushes 2—2 would, in case the current flows between the short circuited brushes 1—1 in a straight line, at a doubling of the speed, rise by 5% only, because the current flowing in the counter exciting winding c would rise by 5%. Therefore only about 0.5 I would remain effective of the primary field I, and thus also the secondary field II would drop to half its power. The current flowing between the short circuited brushes 1—1, however, does not flow in a straight line but (Fig. 4) approximately in a hyperbola. It may also remain constant or drop.

For deriving a current for work from such a machine, it is only necessary to provide a main current winding b, Fig. 3, through which such current flows in the manner described.

Even if the sense of rotation of the machine is reversed, the current will still flow in the same direction as the secondary current is reversed as well as the rotation. Such a machine may therefore also be used with advantage for illuminating vehicles. It may, however, by simply switching over certain winding connections, be converted into a motor so that, when used on motor cars, it may be utilized both as a dynamo for lighting and the like purposes, and as a motor for cranking up the petrol engine. When the machine is to be used as a motor, the shortcircuiting of the pair of brushes 1—1 must be cancelled by turning a switch, and the main current winding of the machine must be connected to the brushes 1—1 in the neutral zone in such a manner, that the motor current produced enters the armature at the positive brush and magnetizes the magnet poles N—S in the sense of the original primary field. Fig. 6 shows the connections for motor work, the arrows indicating the direction of the flow of the current in the windings. It may be seen therefrom, that the current reverses its direction in the armature. In consequence thereof also the current, which may be derived from the brushes 2—2 lying beneath the field magnet poles, also reverses its direction and flows, as hereinbefore stated, now through the counter exciting winding c (neutralizing winding) no more in a sense weakening the primary field, as with the dynamo according to Fig. 3, but strengthening the same (Fig. 6) so that here the transverse field may be utilized for further useful work and all three windings may be employed for producing a field as powerful as possible, so as to make the torque as great as possible when the machine is employed as motor. Of course the counter exciting winding c may, when the machine is being used as a motor, be cut out together with the main current winding b from the brushes 2—2 and be accordingly switched on to the brushes 1—1 into the neutral zone of the primary field, so that the original field is increased as much as possible by the two windings. The said case, that both windings have to be switched off from the brushes 2—2 and on to the brushes 1—1 may occur when a given number of revolutions in the cranking up motor is required for securing ignition in the petrol engine. In this case it may even be necessary to entirely cut out winding c, so that it is not utilized for strengthening the field.

The main current winding may for use as a generator be given the same dimensions as in the hereinbefore described arrangement, so that fields I' and III' are equal or one exceeds the other, so as to have a rising or falling potential with an increasing load. In the same manner the characteristic referred to the speed may be influenced. If the counterfield III' (Fig. 2) produced by the winding c (Fig. 3) is made smaller than assumed in the example, for example if the primary field I is 30% of III+III', the potential will rise with an increasing speed, whilst, on the other hand, if III' is made correspondingly larger a potential may be obtained which will drop with the speed. By suitably dimensioning the windings it is therefore possible to give the machine any desired characteristic.

In charging storage batteries, however, the employment of a main current winding has with machines of known types been carefully avoided, because of a possible back current. The machine according to the present invention is quite proof against such back current. If with a connection as dynamo (Fig. 3) the moment has arrived, at which the battery is fully charged and has risen to the same potential as the dynamo, and therefore there is no current flowing from the dynamo to the battery in a charging sense, the moment has arrived when the dynamo runs idle. The conditions are exactly the same as they have already been described for this condition. If, now, a current were to flow in the reversed direction from the battery to the dynamo, this current would indeed weaken the primary field, but as the current will now also flow in the armature in the reverse direction the tertiary field produced would now not cause any weakening of the primary field, but on the contrary strengthen the same to the same extent as it is weakened by the current flowing in the opposite direction in the main current winding. That is to say, the primary field necessary for maintaining the secondary field has kept exactly its former power, and with it the resulting potential at the brushes of the transverse field 2—2. A machine of this type need therefore, when running normally as a dynamo, not be protected against back current, it being as proof against such back current as against a decrease or an increase of the load or a change in the speed.

A machine excited according to Fig. 3 is excellently suited for lighting a train at a constant potential. The battery B required for lighting the train when standing must be charged while the train is running, so that at the next stop, it may take over the lighting of the train in a reliable manner. For this purpose it is necessary in many instances, to dispose of an additional potential, beside and independent of the normal working potential of the dynamo, so as to allow of a rapid and certain recharging of the battery.

The present invention obtains this object by a second winding with a smaller number of wires and a second collector "$a$" being provided on the existing armature A (Fig. 7). Then potential may be derived from this collector at two points. Once at the pair of brushes 3—3, which are disposed in the same plane with the brushes 1—1. With an increasing speed, the potential will rise with the same in proportion, if the primary field really remained constant. The power of this primary field, however, will with an increasing speed, be influenced by the counter action (neutralizing action) of the counter winding $c$, so that there will be no absolute proportionality between speed and potential. Connected in series with the brushes 2—2, there would therefore be a constant portion of the potential, namely at the brushes 2—2, and a portion at the brushes 3—3 rising with the increasing speed, this latter portion being utilizable for the differential charging of the battery. Fig. 8. When the train is running slowly, the charging up will be small, at a faster speed of the train the greater.

The potential at the brushes 4—4 Figs. 7 and 10 shows a different behavior. Also these brushes are, the same as the main brushes 2—2 in the neutral zone of the secondary field II. Neither does this secondary field have a constant power, as it sinks with the shortcircuit current flowing between the brushes 1—1 which drops with an increasing speed approximately along a hyperbola. As there is a fixed ratio between the number of wires of the main armature A and of the additional armature $a$ the logical consequence is that the two individual potentials will also be at a fixed ratio to each other and independently of the speed, each individual potential will maintain its constant power. If the potentials of both armatures are properly connected in series, it will, therefore be possible (Fig. 8) to supply the lamps as well as the storage battery with different potentials, and independently of each other.

A third possibility consists therein that the brushes 3—3 of armature $a$ (Figs. 7 and 9) and the brushes 1—1 of the main armature A are short circuited. Thereby, in exactly the same manner as hereinbefore described, a second secondary field II' would be produced originating from the primary main field I' said second secondary field II' covering the first would increase the latter to the power II+II' (Fig. 11). It is, however, not possible for the potential at the brushes 2—2 to rise, because the counter action (neutralizing action) of the counter-winding $c$, or of the fields III+III' would also in this case result in a complete compensation of the primary field I, and therefore also both secondary fields II+II' would be cancelled. On the other hand, with a decreasing speed, the secondary field II' would support the original secondary field II effectively in maintaining the potential at the brushes 2—2 constant, even when the speed has sunk far below the normal figure. For compensating the tertiary field which is produced by the battery charging current flowing through the winding of armature $a$, it is only necessary to provide, the same as with the main armature, a further main current winding, which will accordingly compensate this new tertiary field III'.

I claim—

1. In an inherently regulated direct current dynamo, adapted to be used at will as either a generator or as a motor, the combination with a constantly excited primary field, a secondary field produced by the armature winding, a neutralizing winding on the magnet poles, and means for reinforcing the primary excited field, a plurality of sets of brushes, one set of brushes short circuited and located in the neutral zone of the said primary excited field, another set of brushes located in the neutral zone of the said secondary field and connected with a neutralizing winding disposed on the magnet poles, the primary field required for producing the working current being produced by the main current windings.

2. In an inherently regulated direct current dynamo, adapted to be used at will as either a generator or as a motor, the combination with a constantly excited primary field, a secondary field produced by the armature winding, a main winding and an additional winding on the armature connected with a main commutator and an additional commutator respectively, means for reinforcing the primary excited field, a plurality of sets of brushes, one set of brushes short circuited and disposed on the said main commutator in the neutral zone of the said primary excited field, another set of brushes disposed on the said main commutator in the neutral zone of the said secondary field and connected with a neutralizing winding disposed on the magnet poles, another set of brushes disposed on the said additional commutator in the neutral zone of the said primary excited field, the primary field required for producing the working currents being produced by the main current windings.

3. In an inherently regulated direct current dynamo, adapted to be used at will as either a generator or as a motor, the combination with a constantly excited primary field, a secondary field produced by the armature winding, means for reinforcing the said secondary field, means for reinforcing the said primary excited field, a main winding and an additional winding on the armature connected with a main commutator and an additional commutator respectively, a plurality of sets of brushes, one set of brushes short circuited and disposed on the said main commutator in the neutral zone of the said primary excited field, another set of brushes disposed on the said main commutator in the neutral zone of the said secondary field, another set of brushes disposed on the said additional commutator in the neutral zone of the said secondary field, a neutralizing winding on the magnet poles connected with one of the said sets of brushes in the neutral zone of the said secondary field, the primary field required for producing the two working currents being produced by two main current windings.

4. In an inherently regulated direct current dynamo, adapted to be used at will as either a generator or as a motor, the combination with a constantly excited primary field, a secondary field produced by the armature winding, a neutralizing winding on the magnet poles, a main winding and an additional winding on the armature connected with a main commutator and an additional commutator respectively, means for reinforcing the primary excited field, a plurality of sets of brushes, one set of brushes short circuited and disposed on the said main commutator in the neutral zone of the said primary excited field, another set of brushes disposed on the said main commutator in the neutral zone of the said secondary field and connected with a neutralizing winding disposed on the magnet poles, another set of brushes disposed on the said additional commutator in the neutral zone of the said secondary field, the primary field required for producing the working current being produced by the main current windings.

5. In an inherently regulated direct current dymano, adapted to be used at will as either a generator or as a motor, the combination with a constantly primary excited field, of a secondary field produced by the armature winding, means for reinforcing the said secondary field, means for reinforcing the said primary excited field, a main winding and an additional winding on the armature connected with a main commutator and an additional commutator respectively, a plurality of sets of brushes, one set of brushes short circuited and disposed on the said main commutator in the neutral zone of the said primary excited field, another set of brushes disposed on the said main commutator in the neutral zone of the said secondary field, another set of brushes short circuited and disposed on the said additional commutator in the neutral zone of the said primary excited field, another set of brushes disposed on the said additional commutator in the neutral zone of the said secondary field, and a neutralizing winding on the magnet poles, connected with one of the said sets of brushes in the neutral zone of the said secondary field, the primary field required for producing the two working currents being produced by two main current windings.

In testimony whereof I affix my signature in presence of two witnesses.

HANS CHARLET.

Witnesses:
  HENRY W. HAAS,
  WILLIAM E. LAN.